(12) United States Patent
Roelofs

(10) Patent No.: US 6,475,090 B2
(45) Date of Patent: Nov. 5, 2002

(54) COMPENSATING FOR NETWORK LATENCY IN A MULTI-PLAYER GAME

(75) Inventor: Gregory Robert Roelofs, San Jose, CA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/823,434

(22) Filed: Mar. 29, 2001

(65) Prior Publication Data

US 2002/0142843 A1 Oct. 3, 2002

(51) Int. Cl.⁷ .................................................. A63F 9/24
(52) U.S. Cl. ............................................. 463/42; 463/1
(58) Field of Search ............................ 463/1–9, 23, 41, 463/42; 709/200, 205, 208, 218, 223, 228, 226, 227, 248, 249

(56) References Cited

U.S. PATENT DOCUMENTS

| | | | |
|---|---|---|---|
| 5,586,257 A | * | 12/1996 | Perlman ...................... 463/42 |
| 5,695,400 A | | 12/1997 | Fennell, Jr. et al. |
| 5,820,463 A | * | 10/1998 | O'Callaghan ................ 463/42 |
| 5,899,810 A | | 5/1999 | Smith |
| 5,974,442 A | * | 10/1999 | Adams ....................... 709/200 |
| 6,025,801 A | | 2/2000 | Beitel |
| 6,042,477 A | | 3/2000 | Addink |

FOREIGN PATENT DOCUMENTS

| | | | | |
|---|---|---|---|---|
| US | WO-98/14886 | * | 4/1998 | ........... G06F/13/42 |
| WO | WO9814882 | | 4/1998 | |
| WO | WO9814886 | | 4/1998 | |
| WO | WO9814898 | | 4/1998 | |

\* cited by examiner

Primary Examiner—Joe H. Cheng
Assistant Examiner—K. Nguyen
(74) Attorney, Agent, or Firm—Gwenaelle Le Pennec

(57) ABSTRACT

A method is provided for compensating for high-latency computer clients in a multi-player electronic game played on a plurality of terminals connected by a network. A latency value is determined for computer clients operating the terminals. Then a latency compensation factor is determined from the latency value for each client computer. The playing modality of a client computer can then be adjusted based on the latency compensation factor.

10 Claims, 4 Drawing Sheets

```
main program loop
    initialize player_status [all] .current_latency = 0.0;
    [do per-game stuff]
    loop over players:
        if (first_time)
            spawn background_process_to_detect_current_latency (player);
        current_latency = player_status[player].current_latency;
        if (current_latency <= low_latency_threshold)
            set_latency_compensation (player, 0.0);
        else if (current_latency >= high_latency_threshold)
            set_latency_compensation (player, 1.0);
        else /* in linear adjustment region */ {
            compensation_factor = (current_latency - low_latency_threshold) /
                (high_latency_threshold - low_latency_threshold);
            set_latency_compensation (player, compensation_factor);
        }
        notify_all_players_of_capabilities (player);
        [do other per-player stuff]
    end player loop
end main loop
```

FIG. 3A

```
background_process_to_detect_current_latency (int player)
{
    loop until game is over:
        start_time = read_high_resolution_timer();
        send_request_for_ACK (player_status[player].ip_address);
        wait (via loop/semaphore/interrupt)
            until ACK received
        end_time = read_high_resolution_timer();
        high_res_time_interval = end_time - start_time;
        player_status[player].current_latency = 0.5* high_res_time_interval;
        wait (via loop/semaphore/interrupt)
            until read_high_resolution_timer() == start_time + polling_interval;
    end loop
} set_latency_compensation (int player, float value)
{
    player_status[player].invisibility = value;
}
```

FIG. 3B

COMPENSATING FOR NETWORK LATENCY IN A MULTI-PLAYER GAME

BACKGROUND OF THE INVENTION

1. Field of the Invention

This invention is in the field of telecommunications, as it relates to interactive, multi-player computer games played in real time on interconnected computers, such as computers in networks such as the Internet.

2. Description of the Related Art

Since their inception computer games have experienced enormous growth in popularity and sophistication. From the very first video games to those of today, many video games have been designed to be played by two or more players simultaneously. In recent years, advances in computer technology have fueled an explosive growth in digital electronic games. The latest digital electronic games combine three dimensional (3D) graphics with special effects sounds to make playing the games a realistic experience for the players. Advances in computer technology have also allowed the proliferation of inter-networks. Current technology provides a platform for the play of multi-player electronic games whereby two or more players can play a game together via a network interconnecting the users. The network may be a high speed local-area-network (LAN) or a wide-area-network (WAN).

In using the Internet for digital electronic game playing, players from remote locations who have computers equipped for digital electronic game playing can share in a single game, which increases the pool of able and willing players for a game. However, one drawback is that the pool of players typically connect to the Internet through one of a multiplicity of different connections including: digital subscriber lines (DSL), twisted-pair cable, integrated services digital network (ISDN) link, Internet Protocol (IP)/Transmission Control Protocol (TCP) communications, satellite links, 10/100BaseT. Each such connection has associated therewith a characteristic link latency. In general, latency is a measure of a typical message's transit time between two Internet nodes. Accordingly, a lower latency measurement translates to a higher quality connection or link. As an example, an ISDN link or a DSL link will typically support communications with lower latency than a twisted-pair cable.

In general, there are two types of remote multi-player games, "twitch" games and "non-real-time" games. In the context of real-time games, latency becomes an important attribute for the real-time play of "twitch" games. Twitch games are games that require split-second game control by players and cannot tolerate arbitrary communication latencies or delays. Twitch games are by far the most popular category of retail video games-some popular twitch games include "Doom"™, "Mortal Kombat™, "John Madden Football™," "Sonic the Hedgehog™," and "Super Mario Brothers™". Typically, twitch games require less than 100 millisecond communications latency (i.e. delay for a player's action to take effect on the screen) in order for the games to be playable. In addition, twitch games usually cannot tolerate varying delays in communications latency. Non-real-time games are games that are possible to play with substantial communications latency and with varying communications latency. Obvious games in this genre are "strategy" games such a chess and backgammon, but there are also certain action games such as adventure games like "Return to Zork™." by Activision™ or the "King's Quest™" series from Sierra On-line™.

The different latencies between users can create a number of problems to real time and, at times, non real time games. In particular, players having different latencies can experience different results due to the latencies. For example, a low latency player may take an action with respect to a high latency player, and the high latency player may then take an inconsistent action before experiencing the action of the high latency player. Certain efforts have been made in the Prior Art to overcome the varying delays in communication latency. For example, to improve the quality of the communications links between the players computers, one Prior Art commercial game system requires specially designed modems to establish point-to-point telephone links with low latency between players. This method may be non-optimal because it requires the player to have specially designed modems and links which significantly narrows the pool of candidate players.

Other known methods describe methods for communicating state changes to those players in the immediate vicinity of a player for whom the state change occurs. In particular, U.S. Pat. No. 6,025,801 to Brad Beitel, incorporated in its entirety herein by reference, describes a method which allows a server to keep track of where each player is in the virtual environment, and to have messages sent to those players close by to the location, in the virtual environment, of the origin of the state change. For each specific one of the users a change as to a state, associated with the specific user, is transmitted to one or more other users dependent on respective relative distances in the virtual environment between the specific user and each respective one of the other users. Such a technique could allow a virtual environment to scale indefinitely, at the expense of complexity in state caching. However, this technique suffers from the disadvantage that, only the server has the complete and true state of the virtual environment.

SUMMARY OF THE PRESENT INVENTION

An object of the present invention is to provide latency compensating mechanisms to allow high-latency participants in multi-user interactive play to be able to effectively compete with low-latency participants in such games. Briefly stated, the foregoing and other objects are accomplished by the present invention, which provides a method of and system for compensating for high-latency participants (i.e., players) of real-time games. The present invention meets the above need with a method to compensate for the effects of latency experienced by high-latency game participants in a real-time game by providing such participants with compensating advantages such as, for example, improved shielding, invulnerability, invisibility, insubstantiality, and so on.

In accordance with one embodiment of the present invention, at a pre-game design stage, one or more latency threshold values are determined to be used as benchmarks against which the measured latency of players during the play of a real-time multi-player game. Next, during the play of a real-time game, a control loop is executed in which at each iteration, a latency value is measured for each game participant (i.e., client computer). Players are categorized as low or high latency participants in accordance with their measured latency values at each iteration. For those players categorized as high-latency participants, the server provides such high-latency participants with one or more compensating advantages, such as those described above, to neutralize the disadvantages associated with being a high latency participant. Further, high-latency participants may be further distinguished or classified in accordance with the degree of latency. For example, for those participants exhibiting a moderate degree of latency, a single compensating advantage may be employed, and for those participants exhibiting very high latency, two or more compensating advantages may be employed.

Generally, in accordance with the method of the present invention, a latency value is determined for a plurality of computer clients operating said plurality of terminals; a latency compensation factor is determined from the determined latency value for each of said plurality of computer clients; and a playing modality for at least one of said plurality of computer clients is adjusted in response to said determined latency compensation factor. Playing modalities include a feature or characteristic of the game pertaining to a computer client. For example, modalities include a player visibility, speed, life force, maneuverability, protection, strength, firepower, traction, grip and aiming capacity.

In accordance with another embodiment of the present invention, no threshold values are computed, instead compensation is applied as a continuous function of the measured latency value. In this case, the function could be linear or non-linear dependent upon the particular application.

The system of the present invention for compensating for high-latency participants (i.e., players) of real-time games comprises: 1) a network; 2) a plurality of client computers coupled or previously coupled to the network; and 3) a server coupled to the network, wherein the server performs a latency measurement for each of said plurality of client computers; and provides a latency compensating factor for those players (i.e., client computers) for high-latency participants. This may be done, for example, by software, hardware, firmware in the server, or a combination thereof that supports such processing.

BRIEF DESCRIPTION OF THE DRAWINGS

The invention is described below in further detail, by way of example, and with reference to the accompanying drawing, wherein:

FIG. 3 is a table with pseudo code.

DESCRIPTION OF THE DETAILED EMBODIMENTS

The present invention relates to an apparatus and method for compensating for high latency experienced by one or more remote game participants playing a real-time game over a data network. In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

The invention relates to a method of compensating for latency in a multi-player electronic game played on a plurality of terminals communicating via a data network. In the method respective quantities are determined, which are representative of respective latency values associated with communication via the data network involving respective ones of the plurality of terminals. Then, a playing modality is adjusted for at least a specific one of the terminals depending on the respective quantities determined. This determining and adjusting may occur more than once for a game, e.g., at the start and during playing. The adjusting of the playing modality may comprise providing to a player at a particular terminal an advantage or a disadvantage with respect to a further player.

Terminology

The term "multi-player game"—means a game involving multiple participants, e.g., a game in which players are either competing against each other or a game in which players cooperate against an opponent.

Figure 1:
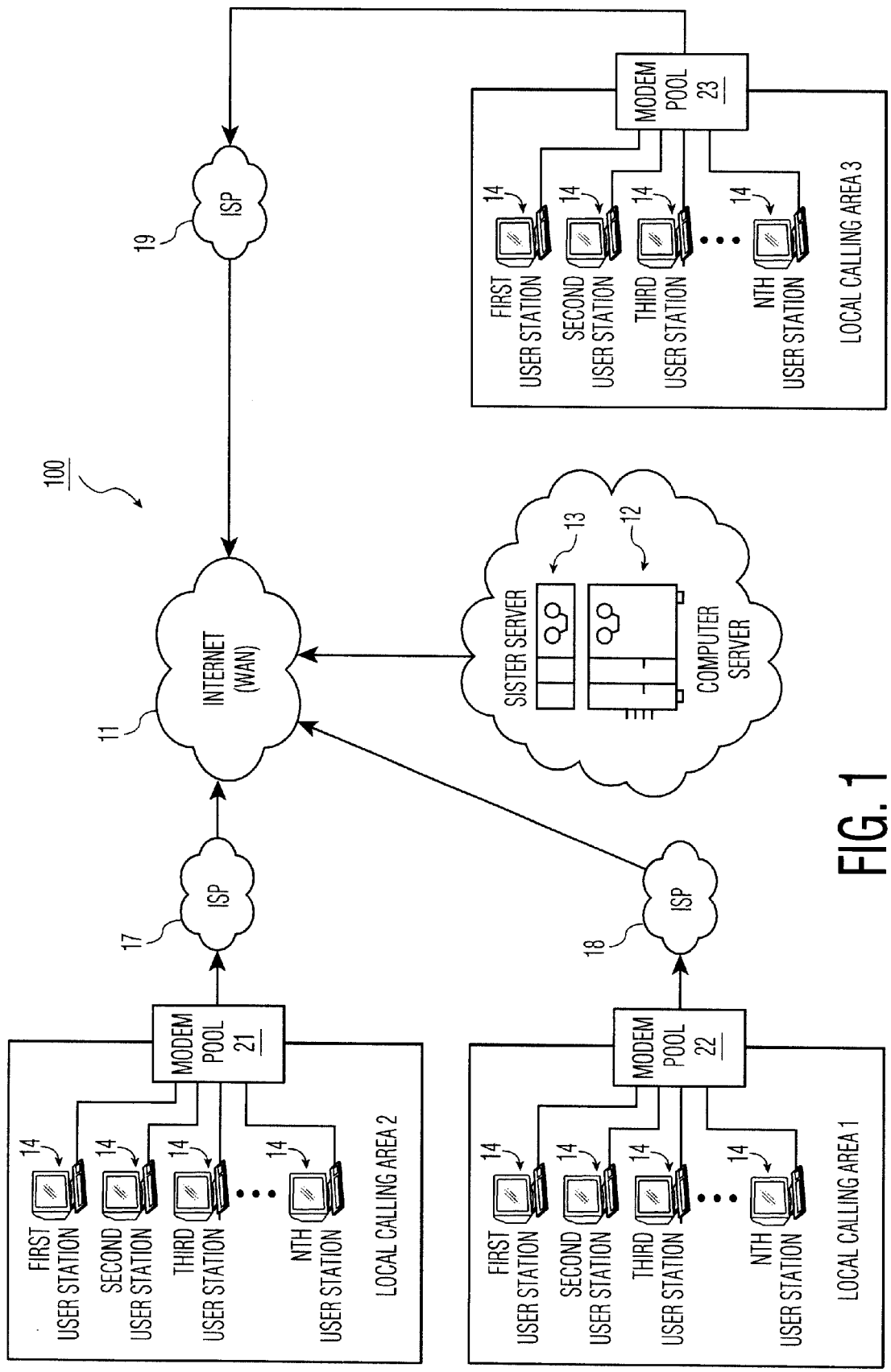
FIG. 1 illustrates a network architecture in which latency compensation may be practiced in accordance with the invention.

The term "client computer"—refers to any suitable input/output device such as an appropriately programmed computer with a keyboard, mouse or trackball and with a display monitor; a personal digital assistant (PDA) with a touch screen; a television with a game console (the well-known "set-top box" concept) and the like. See FIG. 1, depicting client user stations 14. Such stations are well known in the art and consequently are not further described here. A user station 14 may comprise a dedicated device with programming permanently "burned into" a read-only memory (ROM), a smart terminal such as a World Wide Web browser with software "applets" (written in, e.g., Sun Microsystems' Java language) downloaded on demand, or a general-purpose computing device with suitable game programming that is conventionally loaded from a hard disk, CD-ROM, network server, or other mass storage device when the game is to be played. It is anticipated that in many embodiments the user stations 14 will take the latter form because of the ease and low marginal cost of distributing software for controlling, e.g., a Windows-based computer.

The term "network"—refers to spatially or geographically distributed functionalities and includes local area networks, wide area networks, the Internet, cable television systems, telephone systems, wireless telecommunications systems, fiber optic networks, ATM networks, frame relay networks, satellite communications systems, and the like. As indicated earlier, one of the purposes of the present invention is to facilitate the playing of an interactive game over a data communication network such as the Internet having significant latency.

Reference is made to FIG. 1 illustrating a high level diagram of a typical data communications network 100 through which an embodiment of the present invention is implemented. As shown in FIG. 1, the Internet generally is indicated by reference character 11. As is understood, access to the Internet for most users is provided through a so-called Internet service provider such as indicated at 17–19.

As indicated previously, the definitive state of the game is tracked and coordinated by a server, designated generally in FIG. 1 by reference character 12 and described in greater detail hereinafter. Players or users of the game will use their terminals to access the Internet service providers 17–19 through various communication means including: modem connections, cable, DSL, T1, etc. In FIG. 1, the terminals of the users or players are designated by reference character 14 and are generally referred to herein as "client computers".

Application (game) server 12 is typically installed and maintained at a separate site from the Internet service providers 17–19 by an online digital electronic game service provider to perform the necessary tasks of coordinating on-line games for client computers 14, distributed via the Internet. Preferably, at least one application (game) server 12 is placed in close Internet proximity to each major population center. It is to be appreciated that server 12 can also be used in providing other types of computer application services such as word processors, simulations, electronic data processing (EDP), and others.

Since the task of running the game may be considered separate from the business of providing the game, the server 12 may also include a sister server 13 which conducts operations such as registering users, downloading the client computer software and similar activities not directly connected with the running of the game.

Due to the geographic diversity of users and the impracticality of providing specialized communications lines into users' homes, today's on-line services typically use local calling areas (1–3) and modem pools (21–23). Modem pools are a plurality of modems accessible through a local phone number to which computers with a modem can typically dial in without a long-distance telephone toll charge. The data streams to and from modem pools (21–23) are typically multiplexed ("concentrated") into a shared packet-switched data stream which is communicated to a wide-area network ("WAN"), such as the Internet 11 via lines and WAN Interfaces. The Internet 11 provides nationwide (and often worldwide) data transport such that the server 12 through its WAN interface connected to the WAN has access to the concentrated data streams to and from all user terminals 14 in all local calling areas (1–3). The network components and interconnections such as those illustrated in FIG. 1, as well as data protocols supported thereon, are well known to those of ordinary skill in the art. Networks such as that shown in FIG. 1 support the present invention.

Clearly, the architecture of FIG. 1 with multiple local modem pools (21–23) provides significant efficiencies over a simpler time-sharing architecture with a modem pool dedicated to the server 12. Rather than have each user make a long-distance telephone call to the server 12, all calls are local. Although the Internet 11 carries the data the same distance as a long-distance call would have, it generally carries transmitted data digitally (i.e., as packets) over a multiplicity of routes.

Although the network architecture shown in FIG. 1 is efficient for many on-line services, it is neither efficient nor adequate for "twitch" multi-player networked games. As described above, "twitch" games are the category of games that involve real-time, split-second response by the game player. Twitch games are defined herein as games requiring a consistent latency of less than 100 milliseconds (msec) between the moment the user actuates a controller and the moment the effect of that action is reflected in the game play on the video screen. It has been experimentally determined that 100 msec is a generous latency allowance. To put the number in context, a light signal takes approximately 120 ms to travel the earth's circumference. Tests have found that expert game players notice degraded play for latencies on the order of 50 msec. It is therefore apparent that latency is an important communications attribute. In general, latency is the time for a communications data to travel over a network link from one system to another. Total latency on a communications link will be the sum of many factors including the propagation time of signals over long distances. The other factors can generally be minimized or reduced, but propagation delays are set by physical laws. Consider, for example a highly interactive game that is played between multiple clients through a server. Each client in a game instance sends and receives its communications data to the other clients through the server. In this example, also consider that the pool of potential clients to play the game are spread over a wide geographic area and that there are multiple servers also spread through the same area. This is illustrated in FIG. 1 where clients are distributed among a number of local calling areas (1–3) and may be serviced by one or more servers (not shown) affiliated with particular ISPs (17–19). The servers may each have different processing delays (creating relative latency between clients of different servers) and the distance of transmission between servers may create additional relative latencies between servers, for example. Twitch style games have strict latency requirements for the communications delay between the clients and a server used for a game instance. If the latency between a client and the server exceed this, the quality of the game play for the client or all of the clients in the game instance may be unacceptable.

Considering the network architecture in FIG. 1, there exist several technical obstacles, specific to latency, to supporting multi-player twitch video games. These technical obstacles include:

1. WAN Latency

The round-trip latency of the nationwide packet-switched WAN is often more than 500 msec. Additionally, the latency is not always predictable. Sometimes it is under 500 msec, sometimes over 1000 msec. Even in the best case, the latency is too long for a twitch game.

2. Modem Latency

Modems themselves introduce latency (typically over 20 msec) to a data stream due to internal digital signal processing and processing of the raw bit stream. Between the modems of computers 14 and the modem pools (21–23), there are four modems between any two users. This results in typically over 80 msec of latency in modems alone.

3. ISP latency

Latency due to processing speed, capacity, etc., of servers and other hardware and software associated with an ISP.

The present invention therefore provides a system and method to compensate for the latency inherent in network architectures in use as shown in FIG. 1. Prior to playing a representative "twitch" style game, at a game design stage, latency statistics are compiled. A beta test of the game may be performed using system constraints similar to those experienced by players at game time. The latency statistics are accumulated and analyzed to determine whether certain latency threshold values may be identified that maybe utilized in conjunction with corresponding step-wise latency compensation values having regions bounded by the determined threshold values. The functional curves determined in this manner may, in certain cases, result in a more accurate compensation function than could be achieved from the use of a continuous latency compensation curve without threshold values. Such a determination can only be made heuristically, by collecting sample latency values and analyzing them in the aggregate. It is further contemplated that, given the case where threshold values are utilized, a similar sampling may be periodically performed on the network to possibly modify the threshold values to compensate for changing network conditions.

Irrespective of whether the compensation curves use or do not use threshold values, it is the responsibility of the game designer to select one or more compensation approaches to compensate for player latency. The latency compensation approaches selected are specific to each application (game) and may include such approaches as: adherence to the "average path" in the case of a racing game, emission of smoke or oil slicks; a "confusion field" that causes weapons to misfire (e.g., duds) or mis-aim in a shooter, or a compensation approach that causes opposing players to move more erratically when nearby; reduced protection for unusually low-latency players; additional firepower for high-latency players. The particular compensation approach chosen is determined by the individual game's designers. As further examples of compensation approaches, the power of firearms or tire traction could be enhanced for high-latency players. In a racing style game, for example, a high-latency player could be partially slaved to the average trajectory of racers ahead of him/her, effectively mitigating the deleterious effects of the latency by smoothing the high-latency participant's network trajectory in the absence of up-to-date and valid telemetry data of his/her own.

Having determined one or more latency compensation approaches at the game design stage, a game designer must then determine a latency compensation function for implementing the one or more determined latency compensation approaches, as discussed above. The latency compensation function is a curve of measured player latency v. compensation. The compensation curve should be a function for which the degree of compensation is appropriate for all degrees of measured latency.

In general, it is desirable to ramp up compensation for a high-latency player fairly quickly if the game involves rapid-fire weapons. It is contemplated that, the degree of compensation ramp up could be proportional to the rate of damage that could be inflicted on a stuck/helpless player. By contrast, if the game involved only "sticks and stones", for example, the compensating mechanism would ramp up more slowly than in a faster moving game. It is noted, however, that most games are tuned such that the courses demand the same level of reaction time and produce the same relative level of damage for mistakes, regardless of the presumed "actual speed". The principle involved is that the degree of correction should be calibrated to the rate at which the game is played.

The type of compensation curve can vary widely and may be any continuous realizable curve, depending on the statistical evaluations of the game discussed above. Some typical compensation curves may include, for example, a linear curve, a threshold linear curve, a multi-linear approximation, a spline curve, a half-cosine curve, or a tangent curve. Thresholds may be used in conjunction with the curves in those cases where evaluation indicates that thresholds may be used.

Some representative examples are provided which highlight the compensation method of the present invention.

EXAMPLE 1

At the game playing stage, a sporting game, such as football, is used as a representative example of a real-time multi-player networked game. The football game involves close proximity interaction between players and/or objects via the virtual environment. The latency problem addressed by the inventive method is described in this context.

As an example of a problem which may be introduced by network latency, if a player with the ball begins to move to the left, the defender should immediately follow. If the player controlling the defender is afflicted with a higher latency than the offensive player, the defender may have to wait, for example, 500 milliseconds, before he knows the new trajectory of the offensive player. By the time the defender has made his correction, the offensive player may have passed.

To address latency concerns such as those described above, the compensation approaches and functions discussed above are utilized by the inventive method. The compensation techniques are applied during the playing of the game time via the previously constructed latency compensation curve. For example, in the above case, a compensation curve may be employed whereby the defender would be afforded a compensation mechanism commensurate with his measured latency, i.e., 500 milliseconds. The compensation may, for example, provide the defender with an increase in speed to enable him to catch the passed offensive player to compensate for the delay in learning of the new trajectory of the offensive player.

EXAMPLE 2

As a further example, consider a shooting game in which each user's player represents a target to the other players. If one player fires at a second player, the second player should react by either performing an evasive maneuver or deflecting the attack by putting up a shield of some sort. If, however, the second player is afflicted with a higher latency than the shooter, then the time the second player has made a maneuver or attempted to defend himself, it may be that he is already hit.

The compensation techniques are applied during the playing of the game time via the previously constructed latency compensation curve. For example, in the above case, a compensation curve may be employed whereby the defender would be afforded a compensation mechanism commensurate with his measured higher latency. The compensation may, for example, provide the defender with an increased immunity to gunfire or alternatively providing the defender with higher recuperative abilities upon being shot.

The inventive latency compensation method is preferably run as a software routine by the server machine 12. It is clear to a person of ordinary skill in the art that the role of the server 12 can be performed by a single designated server or by a group of servers acting in concert.

Figure 2A:
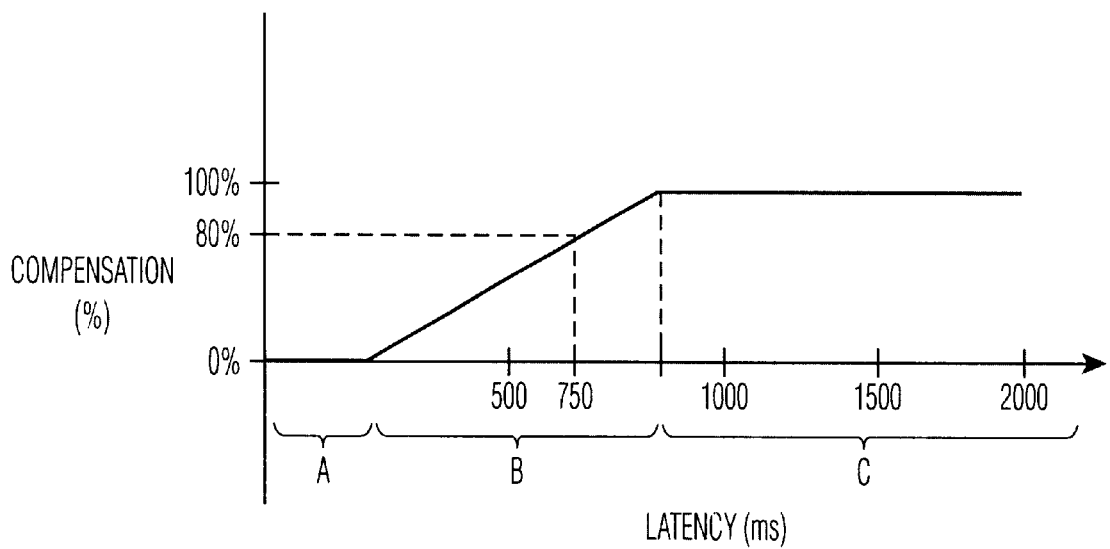
FIG. 2 illustrates exemplary compensation v. latency curves used in accordance with the present invention.

Pseudo-code for representing one embodiment of the software routine, resident at the server 12, is represented in Table I in FIG. 3. The pseudo-code of Table I describes a situation where two latency threshold values are used, i.e., a low and high latency threshold with a piecewise linear curve as shown in FIG. 2a. The threshold values are used to distinguish three separate latency regions. In particular, for those players whose latency is below the low_latency_threshold (i.e., set_latency_compensation (player, 0.0), no compensation is applied. See region A of the curve illustrated in FIG. 2A. For those players whose latency falls between the low_latency_threshold and the upper_latency_threshold, a linear partial compensation is applied. See region B of the curve of FIG. 2A. And for those players having a latency above the upper_latency_threshold, (i.e., set_latency_compensation (player, 1.0) full compensation is applied. See region C of the curve of FIG. 2A. To further illustrate the compensation regions, consider the football example, i.e., example 1, described above. Assume that the compensation mechanism provided is that of providing additional blockers to protect the runner. Given the compensation curve illustrated in FIG. 2a, for example, in this game the respective compensation regions (i.e., A, B and C) may correlate to zero, one or two additional blockers respectively. That is, no additional blockers would be provided for the first region (region A), one additional blocker would be provided for the partial compensation region (region B), and two additional blockers would be provided for the full compensation region (region C).

Figure 2B:
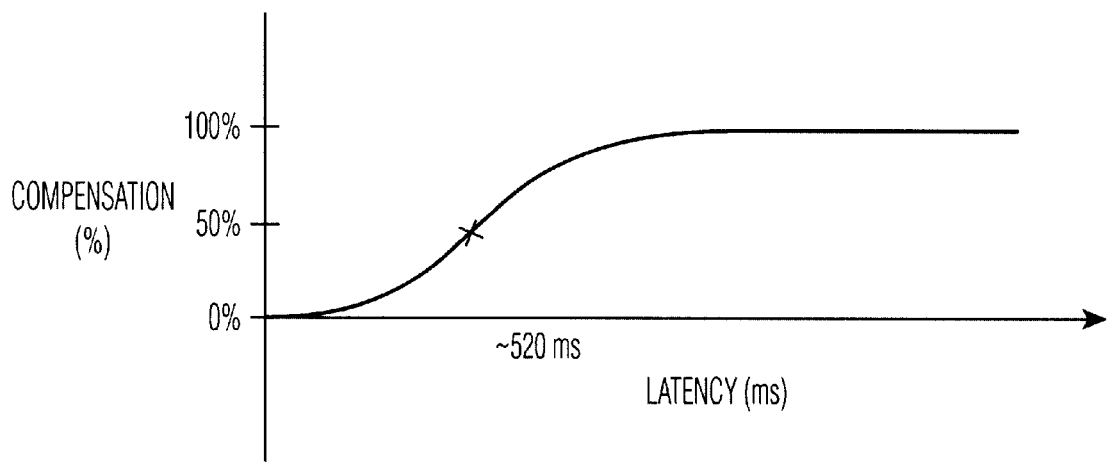

Alternatively, FIG. 2b illustrates a continuous latency compensation curve without threshold values. FIG. 2b is an illustration of an arctangent curve with truncated offset. That is, the curve is truncated at approximately 5.6% of the median value, i.e., 520 ms. The compensation from the curve of FIG. 2b can be represented as:

$$\text{compensation} = (100\%/\text{pi}) * \arctan[(\text{latency}-520\text{ ms})/280\text{ ms}] + 50\%$$

Irrespective of which type of compensation curve is employed, during the playing of a game, a latency parameter associated with each player is initialized to zero. At periodic intervals throughout the game, the latency software routine 54, resident at the server 12, which is run as a background process, computes for each player in the game, a latency value for each player in a current measurement interval.

Determining the latency (i.e., network distance) for each player requires the use of one of a number of methods for determining figures of merit for latency which are well known in the art. For example, the packet Internet groper (Ping) utility is one such utility, well known in the art for, determining the latency between two nodes. A ping is a packet that can be sent from one node to another node in order to determine the round-trip network latency between two nodes. If the client is configured to accept pings it will send back a ping response. The round trip time can then be measured and used as a figure of merit for latency. The measured latency value is then applied to the chosen compensation curve (e.g., FIGS. 2a, 2b) to determine a compensation percentage between 0 and 100%. The compensation percentage is then applied to the selected compensation approach (e.g., invisibility, camouflage). For example, referring to FIG. 2a, in the case where the measured latency of a player is determined to be 750 ms in a particular measurement interval, the corresponding compensation percentage is determined to be 80%. Assuming the game is a game of virtual movement throughout a virtual landscape, the 80% value may cause opposing players to move more erratically by 80% of some maximum (pre-programmed) value. In another example, a user's player in a shooting game may likewise require 80% compensation. This compensation factor may be implemented in a number of ways including, making the user's player visible to the other players only 80% of the time, or increasing the armor that covers the user's player to a value 1.8 times some nominal value. Although all of the steps and components above are desirable in the present embodiment, it is clear to a person of ordinary skill in the art that some steps and/or components may be omitted and/or additional steps or components may be added during implementation and still be within the scope of the invention.

From the foregoing it may be seen that the present invention is well adapted to overcome the shortcomings of the prior art with respect to high or varying time latency in the receipt of information in multi-player electronic games.

Note that the latency problem may be solved entirely in software. Accordingly, the invention may be fully embodied in a storage device comprising an interactive software application for compensating for high-latency game participants.

Also note that the term "multi-player" as used herein may refer to two or more human participants or to one human participant playing against (or with) a virtual participant that is part of the computer game.

Any of the foregoing variations may be implemented by programming a suitable general-purpose computer that has the requisite network connections. The programming may be accomplished through the use of a program storage device readable by the computer and encoding a program of instructions executable by the computer for performing the operations described above. The program storage device may take the form of, e.g., one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial.

What is claimed is:

1. A method of comprising for latency in a multi-player electronic game played on a plurality of terminals communicating via a data network, the method comprising:
   determining respective quantities representative of respective latency values associated with communication via the data network involving respective ones of the plurality of terminals; and
   adjusting a playing modality for at least a specific one of a first and second players of respective first and second terminals depending on the quantities so that the first player is advantaged relative to the second player.

2. The method of claim 1, wherein the determining of the respective quantities and the adjusting of the playing modality are performed more than once during the playing of the game.

3. The method of claim 1, wherein the adjusting of the playing modality comprises providing to the first player at the first terminal an advantage with respect to the second player at the second terminal.

4. The method of claim 1, wherein the adjusting of the playing modality comprises providing to the second player at the second terminal a disadvantage with respect to the first player at the first terminal.

5. A software program for a multi-player electronic game from a plurality of terminals connected via a data network, wherein the program is operative to:
   determine respective quantities representative of respective latency values associated with communication via the data network involving respective ones of the plurality of terminals; and
   adjust a playing modality for at least a specific one of a first and second players of respective first and second terminals depending on the quantities determined so that the first player is advantaged relative to the second player.

6. The program of claim 5, further operative to determine the respective quantities and adjust the playing modality more than once during play out of the game.

7. The program of claim 5, wherein the adjusting of the playing modality comprises providing to the first player at the first terminal an advantage with respect to the second player at the second terminal.

8. The program of claim 5, wherein the adjusting of the playing modality comprises providing to the second player at the second terminal a disadvantage with respect to the first player at the first terminal.

9. The method of claim 1, wherein the latency value associated with communication via the data network involving the first terminal is greater than the latency value associated with communication via the data network involving the second terminal.

10. The software program of claim 5, wherein the latency value associated with communication via the data network involving the first terminal is greater than the latency value associated with communication via the data network involving the second terminal.

\* \* \* \* \*